United States Patent [19]

Boudreaux et al.

[11] E Patent Number: Re. 32,642

[45] Reissued Date of Patent: Apr. 12, 1988

[54] PIPE BASE WELL SCREEN AND SYSTEM FOR JOINING A PLURALITY OF WELL SCREEN SEGMENTS

[75] Inventors: Harry J. Boudreaux, Lafayette, La.; David C. Card, New Brighton; Bernard M. Hanson, Excelsior, both of Minn.

[73] Assignee: Signal Environmental Systems, Inc., New Brighton, Minn.

[21] Appl. No.: 4,176

[22] Filed: Jan. 12, 1987

Related U.S. Patent Documents

Reissue of:

[64] Patent No.: 4,509,600
Issued: Apr. 9, 1985
Appl. No.: 401,500
Filed: Jul. 26, 1982

[51] Int. Cl.[4] ..... E21B 19/16

[52] U.S. Cl. ..... 166/381; 166/380; 166/77.5; 166/85

[58] Field of Search ..... 166/378–382, 166/77.5, 85, 227–236; 175/195; 81/57.16, 57.35; 248/49, 56, 58, 59; 211/60.1

[56] References Cited

U.S. PATENT DOCUMENTS

| | | | |
|---|---|---|---|
| 1,384,688 | 7/1921 | Corrigan | 81/57.16 |
| 1,516,229 | 11/1924 | Cameron | 81/57.35 |
| 1,898,649 | 2/1933 | Wheeler et al. | 166/382 |
| 3,094,852 | 6/1963 | Taylor | 166/77.5 |
| 3,293,959 | 12/1966 | Kennard | 166/77.5 |
| 3,908,256 | 9/1975 | Smith | 166/233 |
| 4,348,920 | 9/1982 | Boyadjieff | 166/77.5 |

*Primary Examiner*—James A. Leppink
*Assistant Examiner*—Bruce M. Kisliuk
*Attorney, Agent, or Firm*—Barry L. Clark

[57] ABSTRACT

Plural pipe-based well screen segments can be assembled more quickly and easily and with no chance of damage to the screen jacket by welding a boss ring to the center pipe of each segment intermediate the upper pipe end and the screen jacket and then using a slip to support the boss ring. The slip is designed to be supported by holes normally present in the master bushing of a rotary drilling table or platform and is of sufficient height that the screen sections can be joined without the operator having to bend over. A pair of relatively light weight, hinged cantilevered plates can be easily lifted to provide clearance for the screen jacket to be lowered through the table and are then moved to their horizontal position just before the boss ring portion of the screen is lowered so as to engage them. A vertical bar on the slip acts as a wrench stop to permit the upper end of the pipe to be held stationary as the succeeding segment of screen is threaded to it.

10 Claims, 1 Drawing Sheet

PIPE BASE WELL SCREEN AND SYSTEM FOR JOINING A PLURALITY OF WELL SCREEN SEGMENTS

Matter enclosed in heavy brackets [ ] appears in the original patent but forms no part of this reissue specification; matter printed in italics indicates the additions made by reissue.

BACKGROUND OF THE INVENTION

The invention relates to well screens and to the slips used to assist in the placement of a long column of separate screen segments in a well. A slip is a device used in the oil well drilling industry to suspend a column of screen in the well. It is used to hold the column of screen segments already in the well as each additional segment is threaded to it. A conventional slip consists of two or three circumferential steel sections that are hinged together. The sections are wedge shaped and have a serrated gripping surface that digs into and frictionally engages the screen jacket portion of the screen segment. Handles are attached to each section and are used for inserting and removing the slip. In operation, a screen segment is lowered into a circular fixture called a bowl. When all but a few feet of the screen are in the well, the slip is placed between the screen jacket and the bowl. As the screen is lowered more, the slip wedges between the screen and bowl and holds the column in place. Another section of screen is then raised above the column and the coupling is made. The column is then raised slightly to relieve the pressure on the slip. The slip is pulled away from the screen and the next length of screen is lowered into the well. The sections of screen are added on until the required amount of screen has been lowered into the well.

Due to the wedge shape of the slip sections and their serrated gripping surfaces, there is a considerable radial pressure applied to the screen jacket surface which can damage it by deforming the wires and thus changing the slot openings. Furthermore, the conventional slips are quite heavy and must be lifted into and out of the bowl every time a new segment of screen is added. Also, since the pipe joint being completed is quite close to the bowl, considerable bending and stooping by the drilling crew is necessary. When the screen jacket is slightly deformed and one or more of its slots are enlarged, the liquid flowing through the screen will tend to be concentrated in the enlarged slot. This increased flow will permit abrasive particles in the liquid to rapidly wear the slot even wider and the screen's useful life will be a small fraction of what it would be with slots having a constant width.

SUMMARY OF THE INVENTION

It is among the objects of the present invention to provide an improved system or method of joining together a plurality of pipe based well screen segments without damaging them. It is another object to provide an improved slip to assist the process which is simpler and faster to use than existing slips which requires a minimum of lifting by the drill crew, and which eliminates the necessity of bending and stooping by the crew. These and other objects and advantages are achieved by the system of the present invention. Our improved system requires that a boss ring be attached, such as by welding, to the upper unperforated section of the pipe base portion of the screen segment between the screen jacket and the coupling. The screen segment is lowered into the well and, while the segment is still supported at its top by an elevator mechanism, the slip is operated to cause screen segment support members to move into position above the screen jacket but below the boss ring. The screen segment is then lowered and released from the elevator after the boss ring is resting on the slip. A second screen segment is then engaged by and lowered by the elevator which supports it by its top while its lower end is screwed into the first screen segment which is supported on the slip. By making the slip so that it supports the boss ring at a considerable distance above the drilling table or platform, the top of the supported screen segment can be positioned so that it can be engaged with a wrench without stooping or bending on the part of the drilling crew. In a preferred construction of the slip, the slip is provided with legs which are dropped into existing holes in a master bushing on the drilling table which are engaged by a drive bushing during a drilling operation. The slip has a pair of flap-like plates which are pivoted about spaced horizontal, parallel axes. In their operative horizontal position, a semi-circular cut-out in their facing ends accepts the pipe base portion of the screen segment while the upper portion of the plates defining the edges of the cut-out supports the boss ring. The plates are lifted to a vertical position when the column of screens is lifted by the elevator just prior to being lowered downwardly into the hole. A vertical bar on the slip acts as a wrench stop to eliminate the necessity of a crew member having to hold a wrench to the pipe portion of the supported screen segment as tongs, a second wrench, or another rotation including means is used to thread the succeeding segment of screen onto the supported segment.

DETAILED DESCRIPTION OF THE INVENTION

Figure 1:
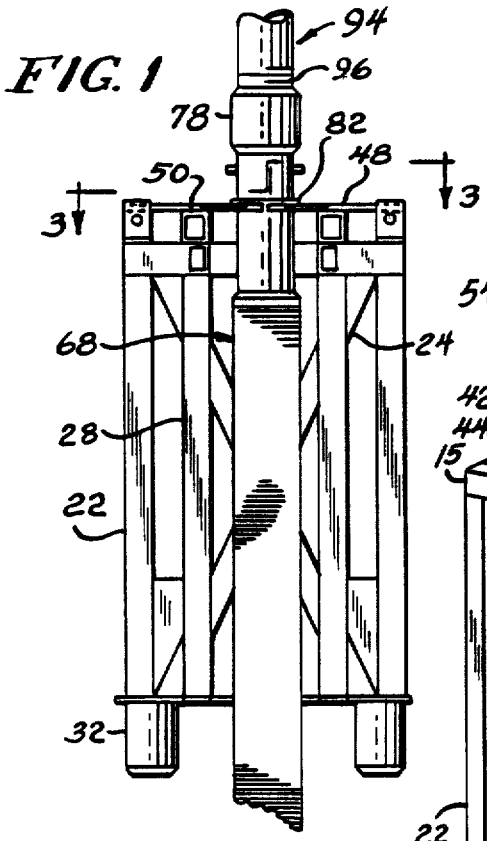
FIG. 1 is a front view of the improved slip with its screen retaining support plates in their operative position relative to the lower screen segment while a second screen segment is being threaded to it.
Figure 3:
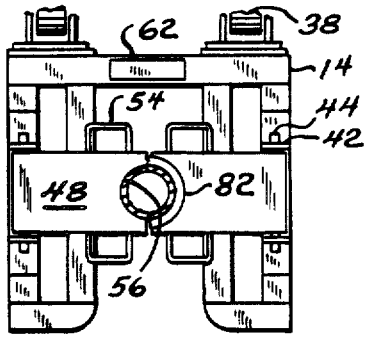
FIG. 3 is a top sectional view of the slip taken on line 3—3 of FIG.1.
Figure 5:
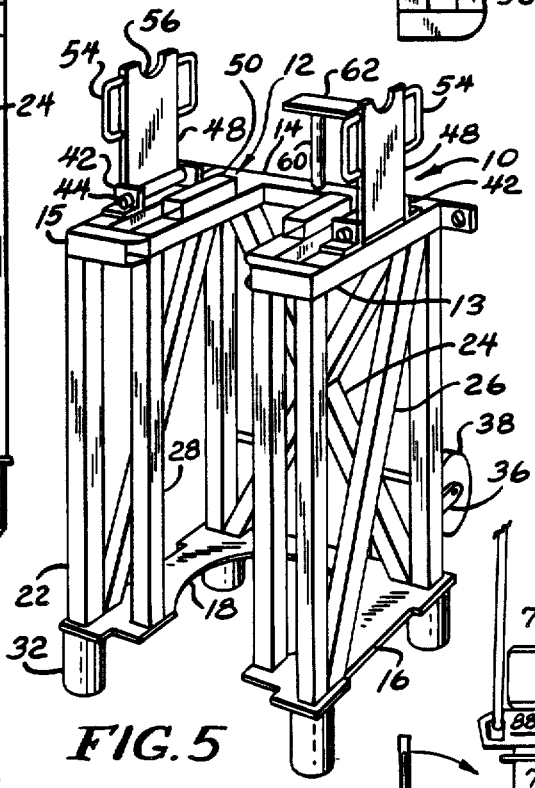
FIG. 5 is a perspective view of the slip apparatus with its support plates in their non-operating position.
Figure 2:
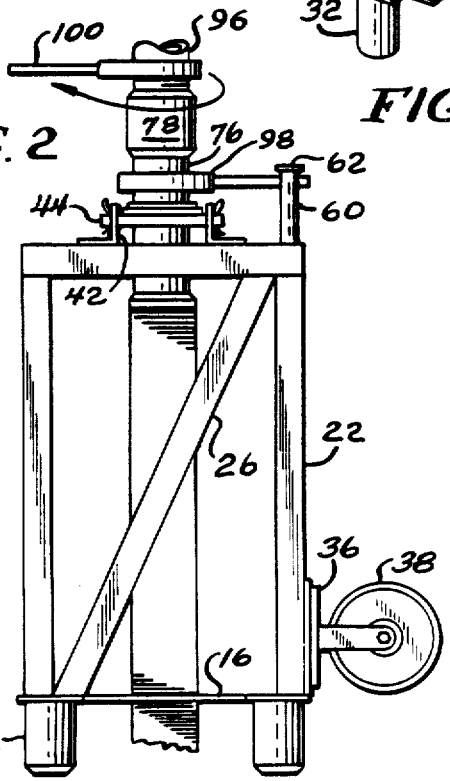
FIG. 2 is a side view of the slip of FIG. 1, illustrating the use of a pair of tubing tongs to thread two screen segments together.

Referring to the drawings, the improved slip assembly is indicated generally at 10. The assembly may be constructed of conventional steel structural products such as suitably dimensioned square steel tubing, angles and plates which are welded to each other. The top surface 12 of the assembly comprises said frame rails 13, back frame rail 14 and a pair of aligned but spaced-apart front frame rails 15. The bottom plate portion 16 of the assembly is open at the front of the slip and includes a large aperture 18 through which lengths of well screen may be lowered into a well (not shown). Four corner posts 22 support and space the top surface 12 relative to the bottom plate 16. The rigidity of the structure is enhanced by the presence of angled rear braces 24 and side braces 26 as well as by the pair of inner posts 28 which are located at the front of the assembly. The slip assembly is designed so that its base plate 16 can be supported on a horizontal portion of a drilling rig such as the master bushing of a rotary drilling table. Four legs 32 which are rigidly attached to the lower corners of the slip assembly, are adapted to be located in correspondingly shaped holes in the master bushing of the drilling table so as to prevent rotation of the slip assembly. Transportation of the slip assembly or apparatus between jobs is facilitated by the attachment to the back thereof of a pair of brackets 36 to which are mounted a pair of wheels 38. Two pairs of pivot brackets 42 mounted on opposite sides of the slip apparatus contain apertures for mounting pivot shafts 44 on which are mounted a pair of flap plates 48. The slip plates comprise the only moving part of the slip apparatus and can be manually moved between their horizontal position shown in FIG. 1, wherein they are resting on fulcrum support rails 50, and their vertical position shown in FIG. 4. The flap plates can be manually moved from either the back or the front of the slip by means of handles 54. The facing edges of the flaps which are adjacent each other in the FIG. 1 operative position have semi-circular cut-outs 56 for accommodating the pipe base portion of a well screen. An upstanding wrench stop shaft 60 at the rear of the slip apparatus has a transverse cross bar 62 welded to its top for a purpose to be hereinafter described.

Figure 4:
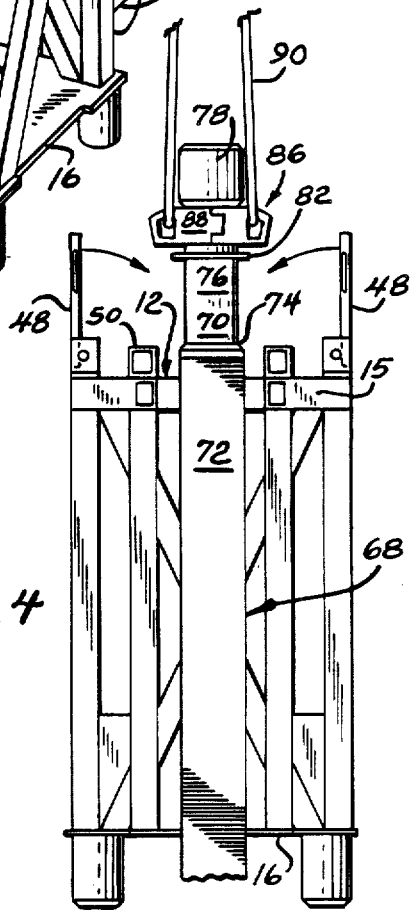
FIG. 4 is a front view of the slip with the support plates in their non-operating position and showing a screen segment in the position to which it is lowered and held by an elevator just before the support plates are pivoted to their FIG. 1 operating position.

In operation when it is desired to lower a number of segments of well screen into a well, the slip apparatus is placed over the opening in the drilling platform (not shown). FIG. 4 illustrates the placement of a first screen segment 68. The lower end of the segment (not shown) will typically have a sealing plug threaded to the lower end of the pipe base member 70. The pipe base member 70 is perforated (not shown) along the portion of its length which underlies the screen jacket member 72 which is welded to it at 74. An unperforated portion of the pipe base 76 extends between the weld 74 at the upper end of the screen jacket and the upper end coupling member 78. Intermediate the ends of this pipe base portion 76, a boss ring or equivalent structure 82 is integrally attached, such as by welding, to the pipe base. The screen segment 68 is engaged, lifted and held by a collar type of elevator mechanism 86 which may be of conventional construction and includes a pipe-engaging portion 88 which loosely engages the exterior of the pipe base portion 76 and supports the larger diameter coupling member 78. The engaging portion 88 is supported by lifting cables 90 in a conventional manner. The screen segment 68 is lowered to the position shown in FIG. 4 by the elevator 86. In this position, the boss ring 82 and weld portion 74 are, respectively, above and below the path of movement of flap plates 48 as the flap plates are manually pivoted to their FIG. 1 position. After the flap plates are lowered to rest on the fulcrum supports 50, the elevator mechanism 86 is operated to lower the screen segment so that the boss ring 82 thereon will contact the upper surface of the portion of the flap plates which defines the cut-out portions 56. Once the first segment 68 is supported by boss ring 82 in the slip assembly, as shown in FIG. 1, the elevator mechanism 86 may be disconnected from the first screen segment. The elevator is then used to support a second screen segment 94 as threads on its lower end 96 are started into threaded engagement with the coupling 78. The threading may be accomplished very simply by attaching a first wrench or tongs 98 to the pipe base portion 76 on the first screen segment in a way such that its handle will be stopped by the upstanding shaft member 60,62 when a second wrench or tongs member 100 is engaged with an unthreaded portion of the lower end 96 of the second screen segment 94 and rotated in a tightening direction.

As will be readily obvious from the preceding description, the addition of a boss ring to each segment of a well screen and the use of our special slip to support the screen by the boss ring considerably facilitates the threading together of a column of well screen segments and eliminates the damage to the screen jackets which is possible with wedge-type slips which frictionally engage the screen jacket with serrated jaws. Since the improved slip does not have to be lifted in its entirety into and out of an opening in the drilling table each time a segment is added to the column, it will be further obvious that much time and work effort will be saved by using our improved support system. The slip can be constructed to be of a height which will support a screen segment at a selected working height above the drilling table. Thus, it can be readily appreciated that the system makes it possible for the equipment operators to move the flap plates 48 into and out of position and to operate the tongs 98, 100 without stooping or bending. This is a considerable advantage over prior art slips which engage the screen jacket since such slips require that the tongs engage the pipe base portion of the screen segments at a location just above the drilling table.

In a particular slip that was constructed as depicted in the drawings, 2×2×¼" square steel tube was used for the back legs and braces, 2×2×3/16" tube for the inside front legs and top members, 2×2×3/16" steel angles for the outside front legs and side braces, and ½" steel plate for the base 16 and the support flaps 48. The legs or pins 32 were made 4⅛" long of 3¼" diameter, ¼" thick, steel tubing. The total weight of the slip was about 220 pounds. By using interchangeable support plates 48 which each weigh about 10 pounds, the slip can accommodate screen sizes of at least 2-1/16" to 5½" diameter. It has a load capacity of 12,000 pounds and can handle 4,500 foot pounds of torque for making up joints. The base 16 was 20" square and the slip height was such that the plates 48 were 33" above the base 16 in their operative position.

We claim as our invention:

1. A method of supporting a first segment or column of pipe base well screen relative to a horizontal support means such as a member which is adapted to be fixed relative to a well casing while a second segment of screen or pipe is attached to a coupling at the upper end of the first segment, comprising the steps of attaching a boss ring or equivalent projection at a location intermediate the ends of an unperforated upper portion of the pipe base member portion of the well screen which extends between an end mounted coupling and the upper end of a screen jacket member which is supported by the pipe base member; engaging and suspending the coupling at the upper end of said first segment by elevator means above said horizontal support means so that said boss ring and a portion of the screen jacket is at at least a predetermined distance above said horizontal support means; positioning [the] movable support plate portions of a screen slip assembly which are supported by said horizontal support means and movable relative thereto in an operating position above the screen jacket and immediately surrounding the pipe base member; lowering the upper end of said first segment with said elevator means until said boss ring is engaged and supported by said screen slip assembly support plate portions; removing said elevator means from said first segment and using it to support a coupling at the upper end of said second segment; applying wrench or other gripping means to the pipe base portion of said first segment which is between said coupling and boss ring and to the lower end pipe base portion of said second segment to threadedly engage said first and second sections to each other; lifting said second segment with said elevator means to cause said boss ring to move upwardly relative to the support plate portions of said screen slip assembly; and moving said support plate portions out of the path of said boss ring to an inoperative position to permit said first and second segments to be lowered without moving said horizontal support means.

2. A slip assembly for use in a system for joining successive lengths or segments of pipe base well screen which have a screen jacket portion mounted on a pipe base member at a predetermined distance from a coupling at the upper end of the pipe base member and a boss ring integrally mounted to the pipe base member intermediate the screen jacket and coupling, said slip assembly comprising upper and lower support surfaces which have central apertures therethrough for accommodating vertically positioned well-screen segments, said upper and lower support surfaces having overlying portions of said apertures extending to an open side edge thereof; means for vertically spacing said upper and lower support surfaces; means for locking said slip assembly against rotation relative to a horizontal surface upon which its lower support surface is resting; and a plurality of support plates mounted on said upper support surface for movement relative thereto, said support plates being selectively movable from an inoperative position into an operative position, adjacent to each other and immediately surrounding the periphery of the pipe base portion of a well screen which is above a screen jacket portion, wherein they will engage and support the lower surface of the boss ring on a screen segment that is lowered into contact with them.

3. A screen slip assembly in accordance with claim 2 wherein a wrench stop member is rigidly mounted to said upper support surface so as to project upwardly into the path of a wrench or other pipe engaging member which is engaged with and projects radially from a portion of a pipe base member located between a boss ring and upper pipe coupling when the boss ring is resting on the support plates in their operative position.

4. A slip assembly in accordance with claim 2 wherein said means for locking said slip against rotation comprises a plurality of vertical projections extending downwardly from said lower support surface, said plurality of projections being adapted to engage complementary apertures in a horizontal drilling table member on which the slip assembly is adapted to be positioned during use.

5. A screen slip assembly in accordance with claim 2 wherein said support plates are pivotally mounted on opposite sides of said upper support surface on parallel horizontal axes for movement between a horizontal operative position and a generally vertical inoperative position.

6. A screen slip assembly in accordance with claim 2 wherein said support plates have semi-circular cut-out portions in their respective edges which are immediately adjacent each other when said supports are in their operative position.

*7. A method of supporting a first segment or column of pipe base well screen relative to a horizontal support means such as a member which is adapted to be fixed relative to a well casing while a second segment of screen or pipe is attached to a coupling at the upper end of the first segment, comprising the steps of providing a projection means on an unperforated upper portion of the pipe base member portion of the well screen which extends above the upper end of a screen jacket member which is supported by the pipe base member; engaging and suspending the upper end of said first segment by elevator means above said horizontal support means so that said projection means is at at least a predetermined distance above said horizontal support means; positioning a movable support plate means of a screen slip assembly, which said support plate means is supported by said horizontal support means and movable relative thereto in an operating position above the screen jacket and immediately surrounding at least more than half of the circumference of said pipe base member; lowering the upper end of said first segment with said elevator means until said projection means is engaged and supported by said screen slip assembly support plate means; removing said elevator means from said first segment and using it to support the upper end of said second segment; applying wrench or other gripping means to a portion of said first segment which is located above said screen jacket and to the lower end pipe base portion of said second segment to rotate said pipe segments relative to each other so as to threadedly engage said first and second sections to each other; lifting said second segment with said elevator means to cause said projection means to move upwardly relative to said support plate means of said screen slip assembly; and moving said support plate means out of the path of said projection means and into an inoperative position to permit said first and second segments to be lowered past said horizontal support means without moving said horizontal support means.*

*8. A slip assembly for use in a system for joining successive lengths or segments of pipe base well screen which have a screen jacket portion mounted on a pipe base member at a predetermined distance from the upper end of the pipe base member, said slip assembly comprising upper and lower support surfaces which have central apertures therethrough for accommodating vertically positioned well screen segments, said upper and lower support surfaces having overlying portions of said apertures extending to an open side edge thereof; means for vertically spacing said upper and lower support surfaces; means for locking said slip assembly against rotation relative to a horizontal surface upon which its lower support surface is resting; and support plate means mounted on said upper support surface for movement relative thereto, said support plate means being selectively movable from an inoperative position into an operative position in which it immediately surrounds at least more than half of the periphery of the pipe base portion of a well screen which is above a screen jacket portion, so that, when said support plate means is in its said operative position, and the screen segment is lowered into contact with it, it will be capable of engaging and supporting the lower surface of a projection means attached to the upper end portion of the pipe base member at a location above the screen jacket portion.*

*9. A screen slip assembly in accordance with claim 8 wherein a wrench stop member is rigidly mounted to said upper support surface so as to project upwardly into the path of a wrench or other pipe engaging member which is engaged with and projects radially outwardly from a portion of a pipe base well screen member which is located above said screen jacket and above said support plate means.*

*10. A screen slip assembly in accordance with claim 8*

*wherein said means for locking said slip against rotation comprises a plurality of vertical projections extending downwardly from said lower support surface, said plurality of projections being adapted to engage complementary apertures in a horizontal drilling table member on which the slip assembly is adapted to be positioned during use.*

* * * * *